Aug. 28, 1934.   H. S. LABOMBARDE   1,972,021
MACHINE FOR MAKING BOXES
Filed April 3, 1930   10 Sheets-Sheet 1
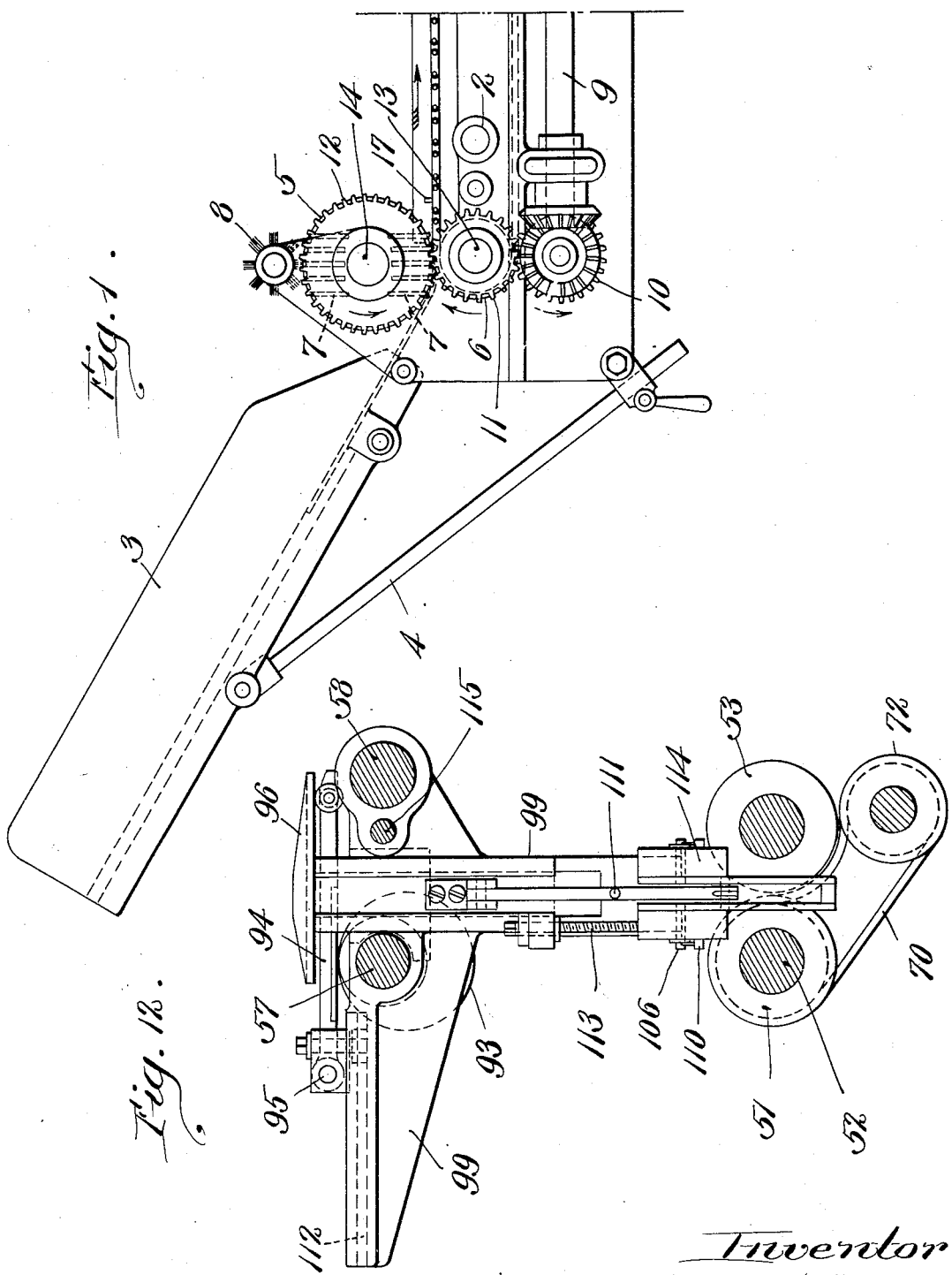

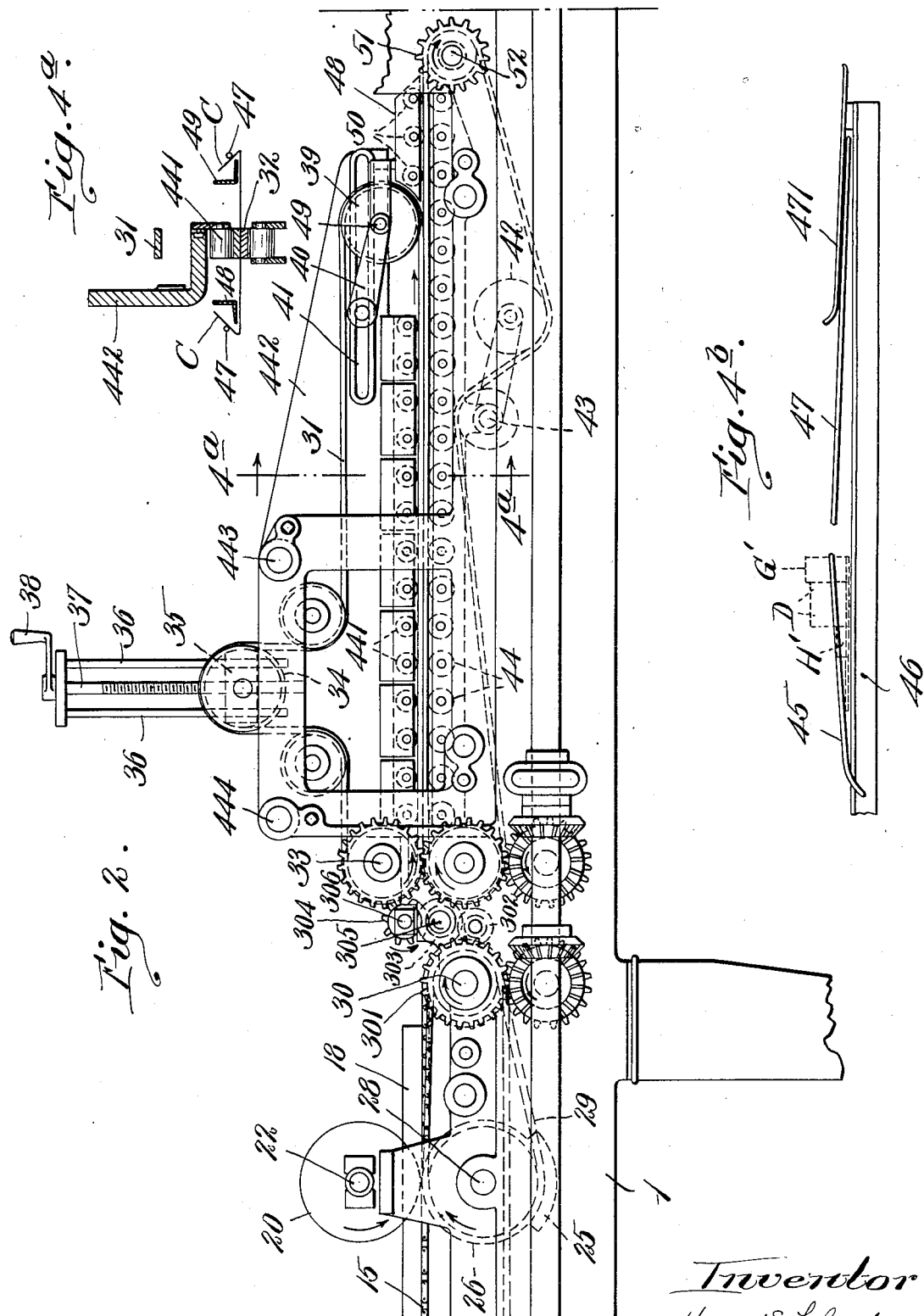

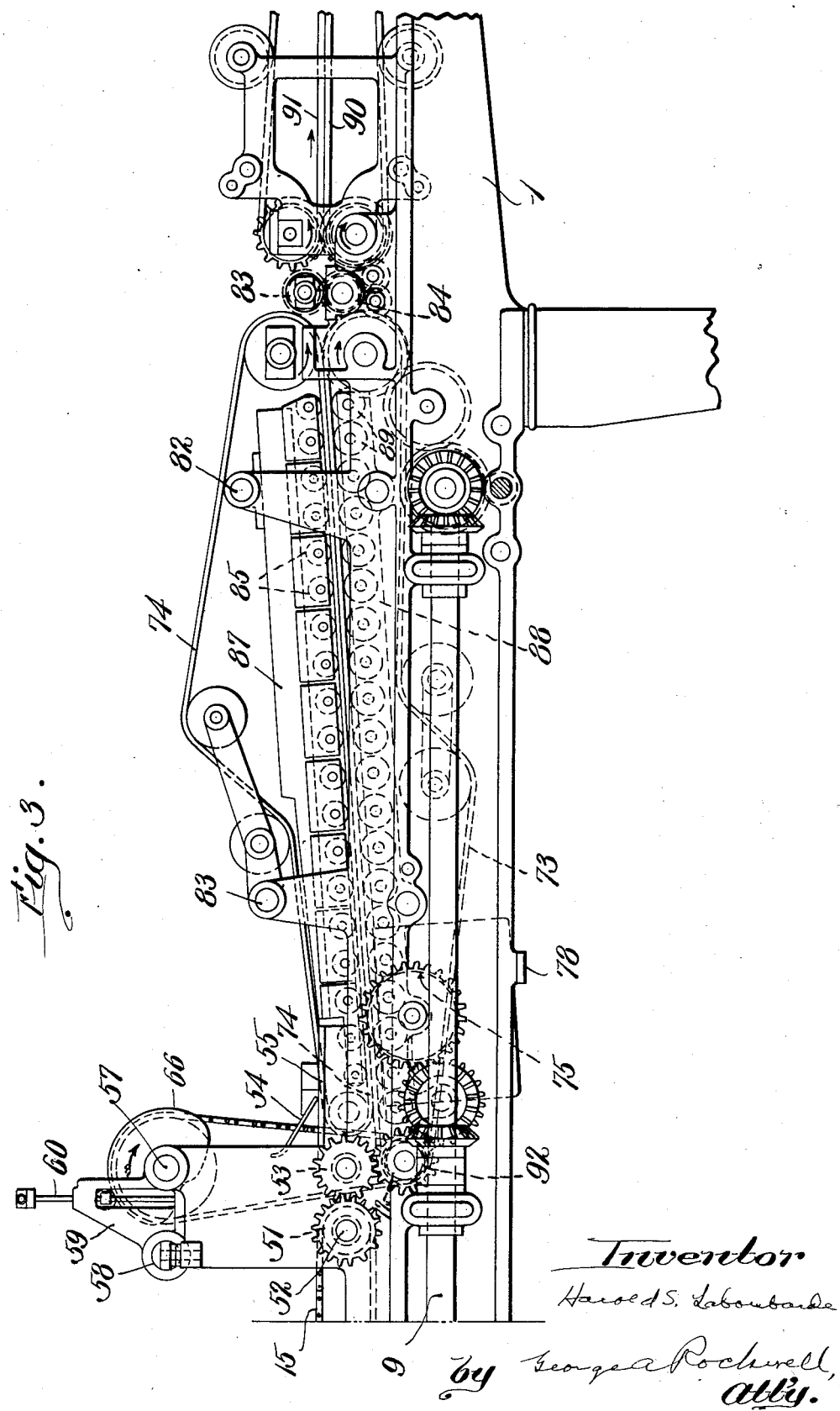

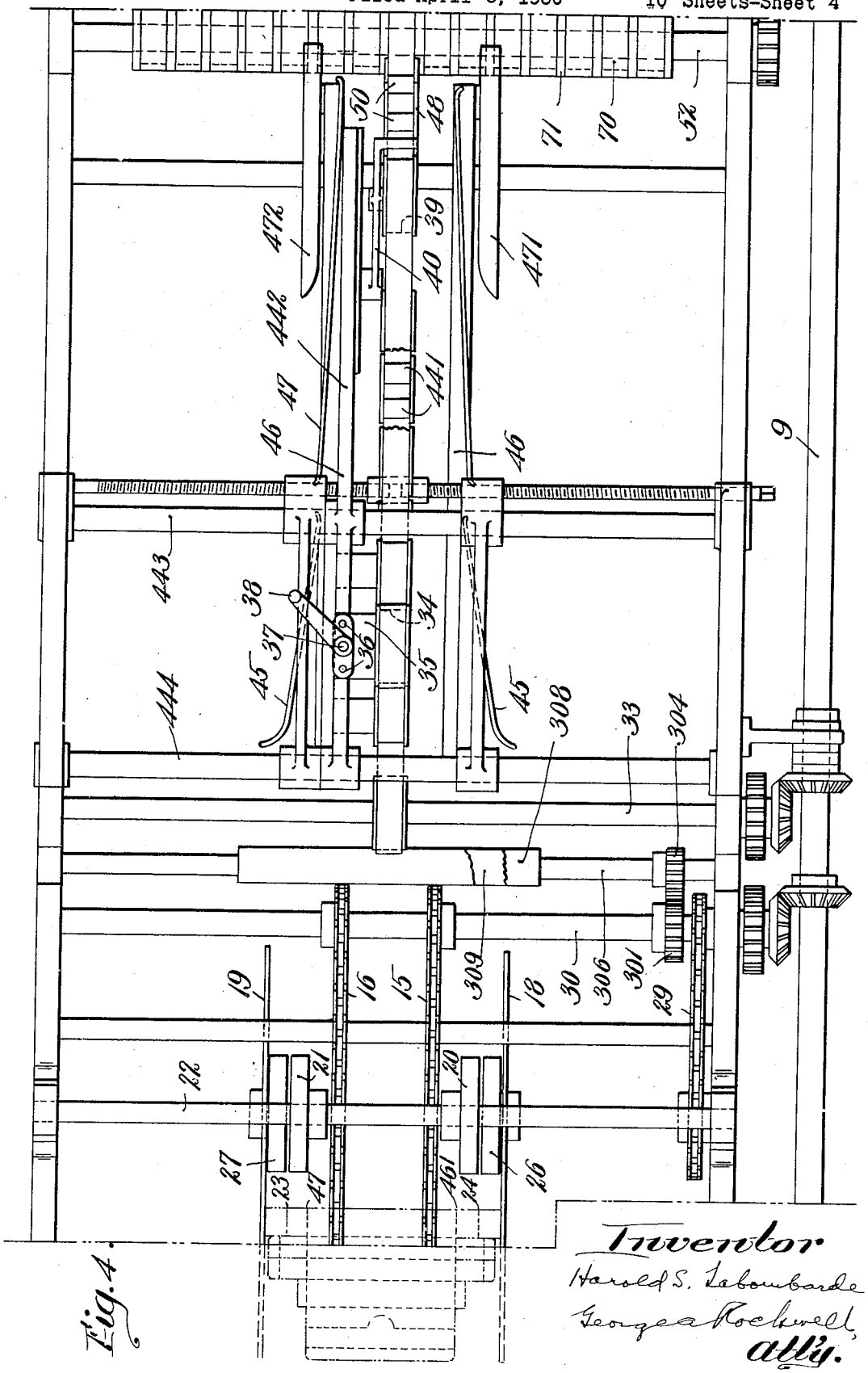

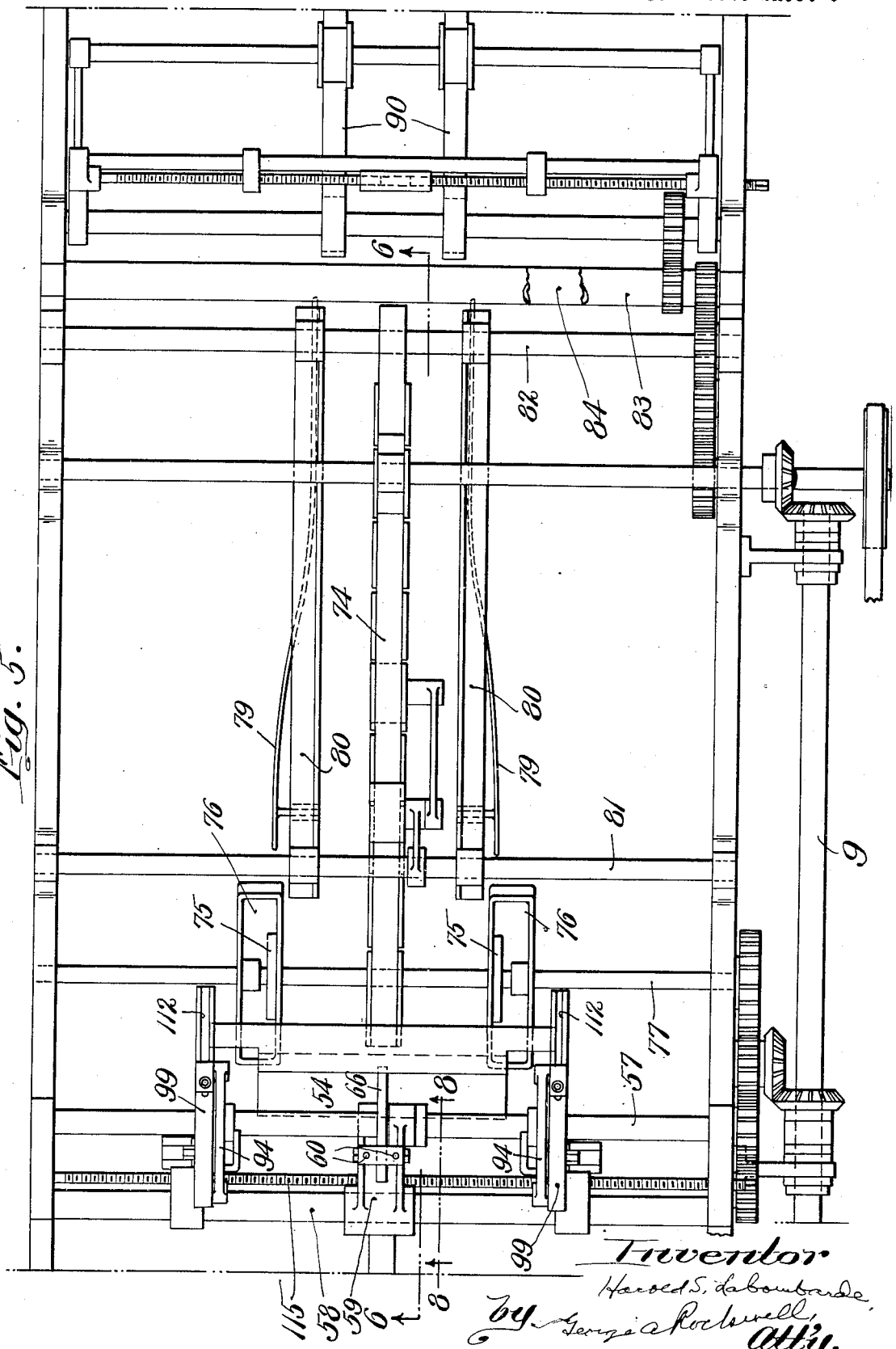

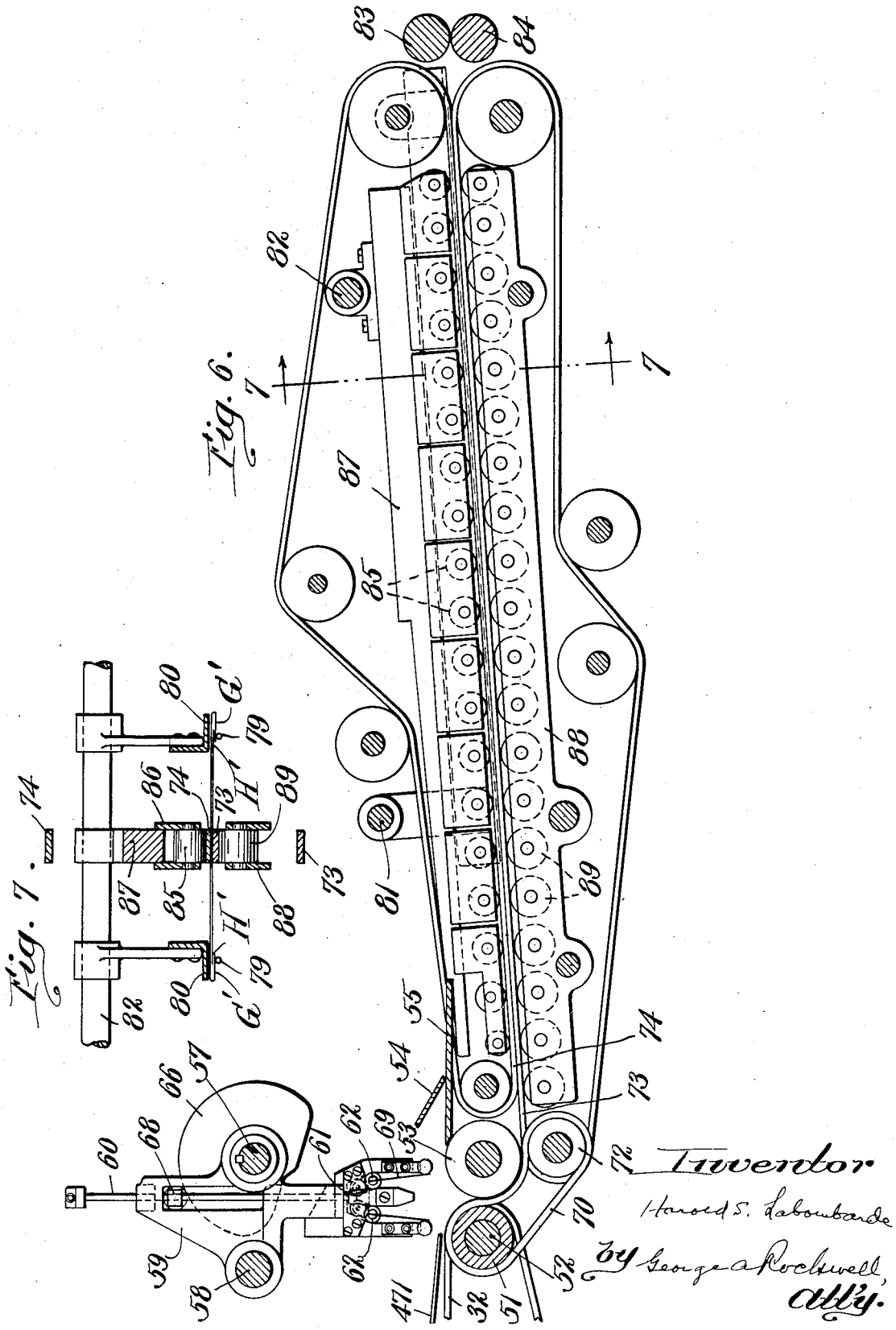

Aug. 28, 1934.  H. S. LABOMBARDE  1,972,021
MACHINE FOR MAKING BOXES
Filed April 3, 1930   10 Sheets-Sheet 7
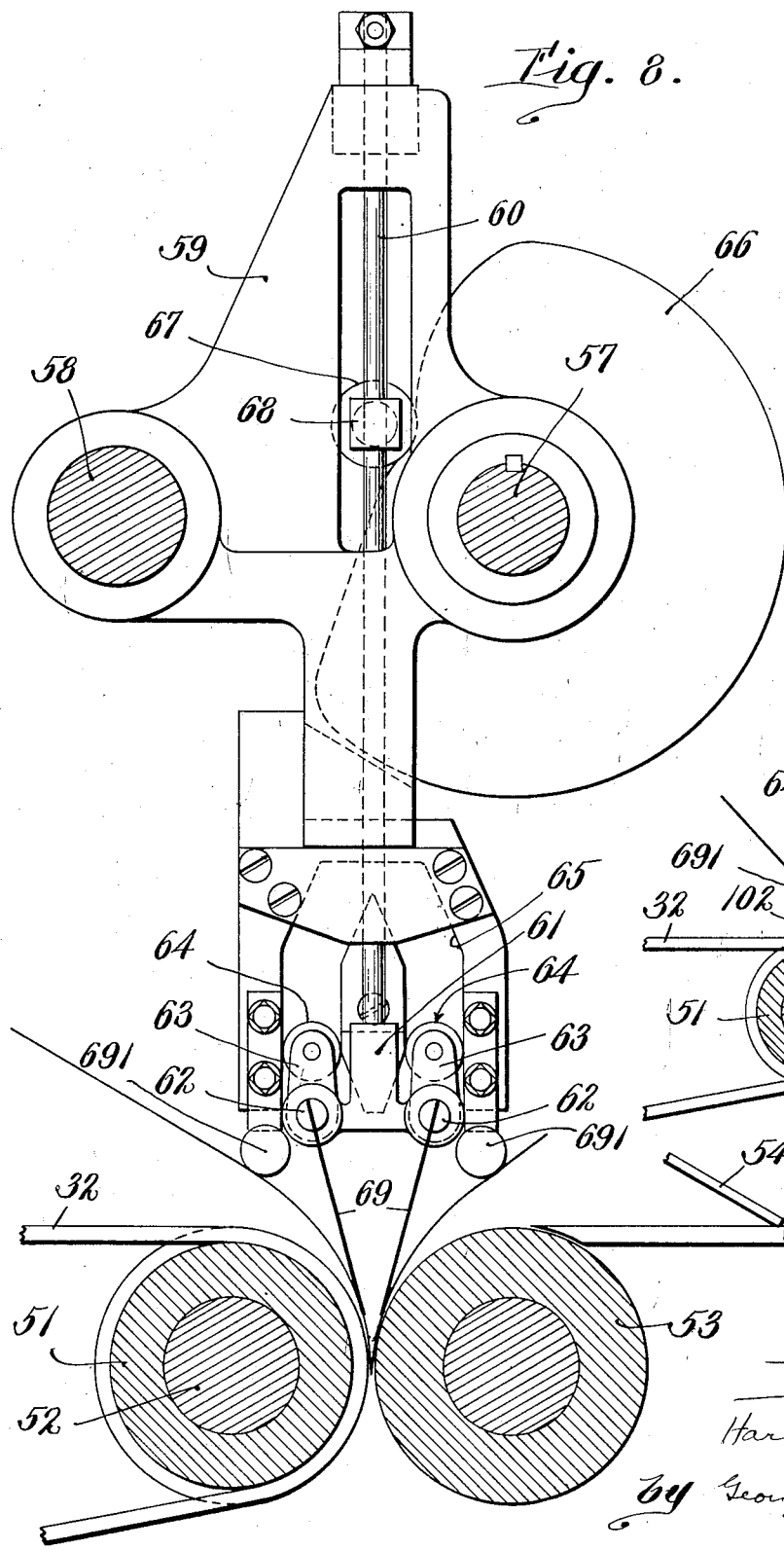

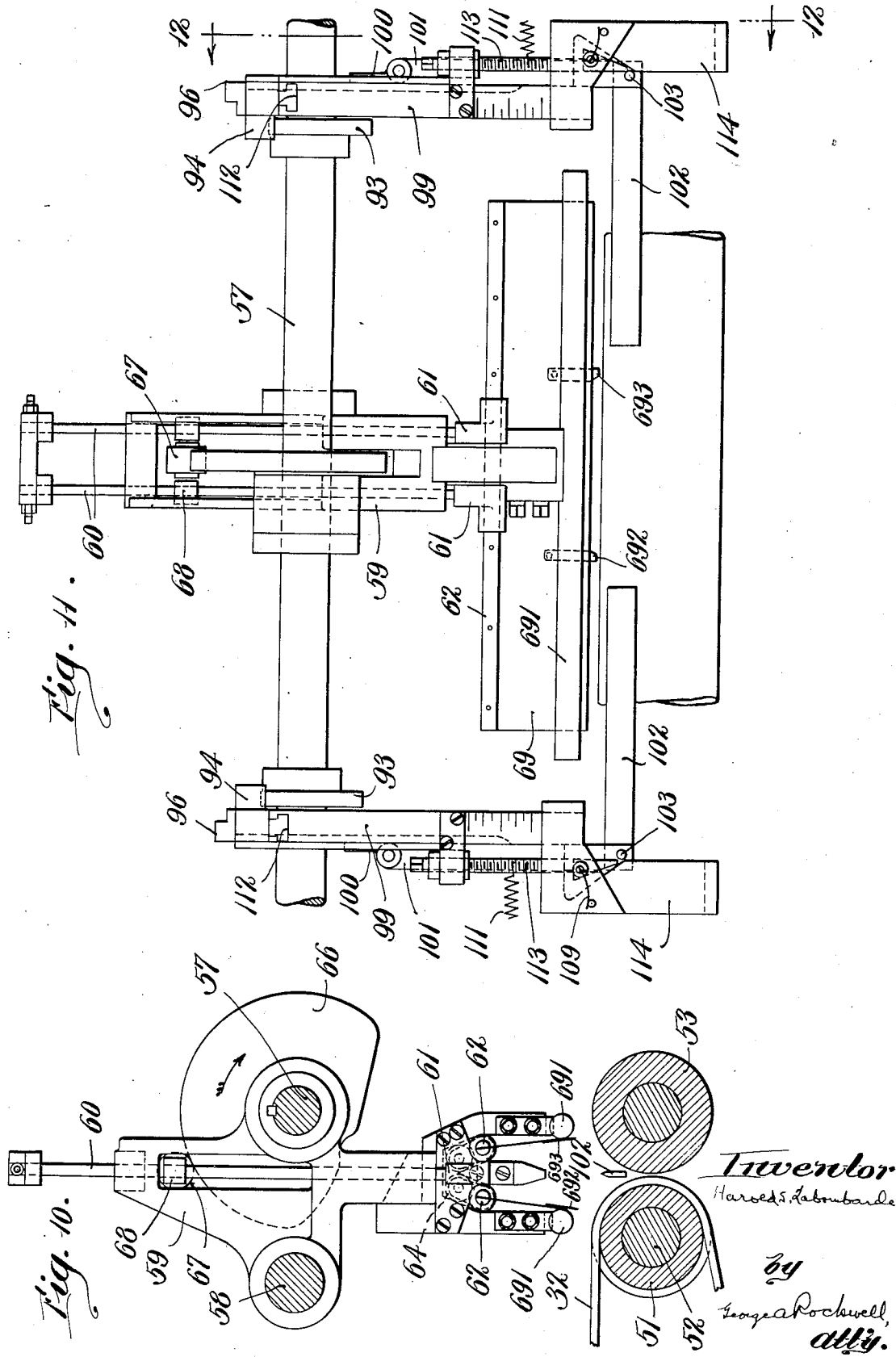

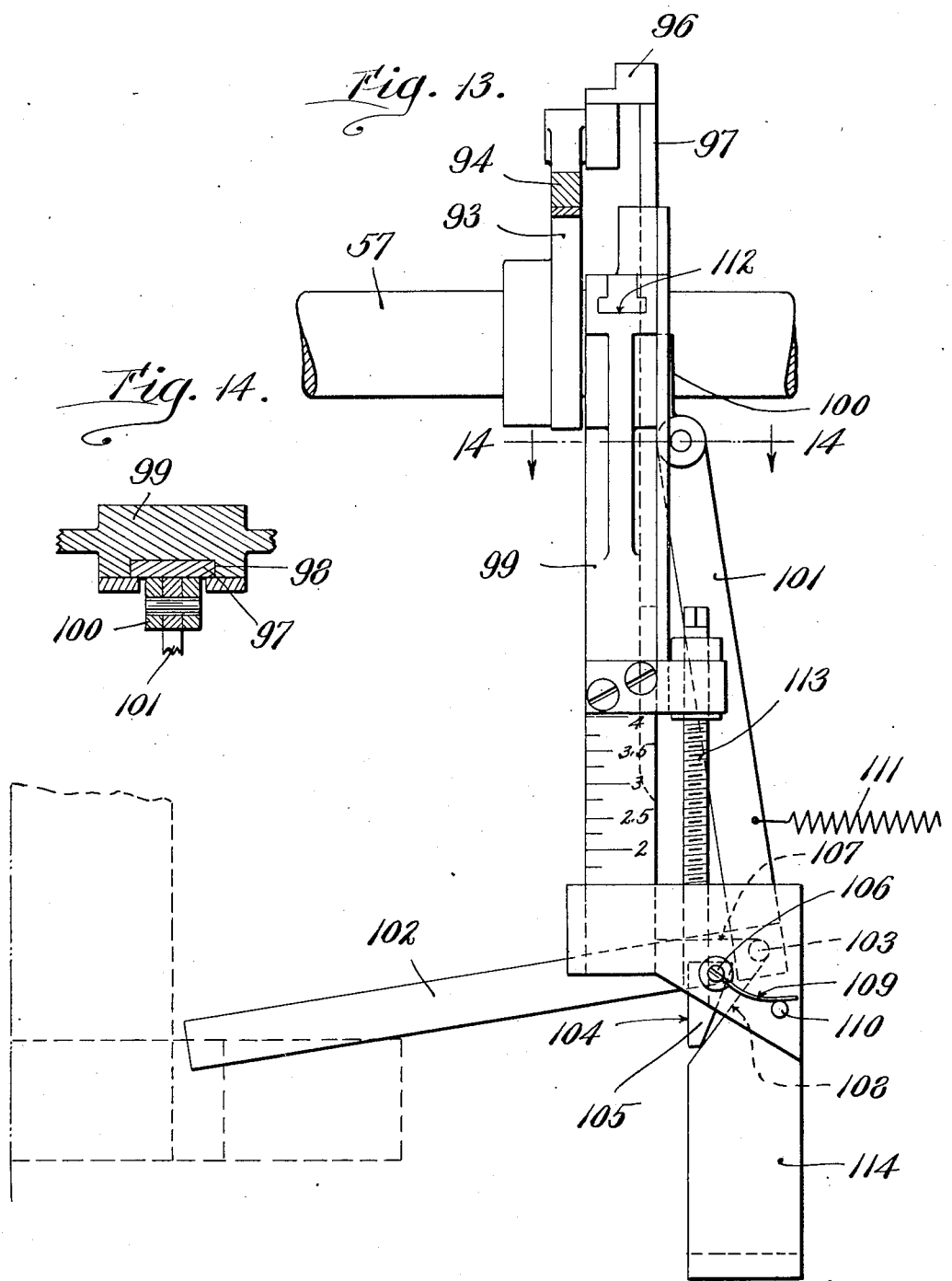

Aug. 28, 1934.   H. S. LABOMBARDE   1,972,021
MACHINE FOR MAKING BOXES
Filed April 3, 1930   10 Sheets-Sheet 10
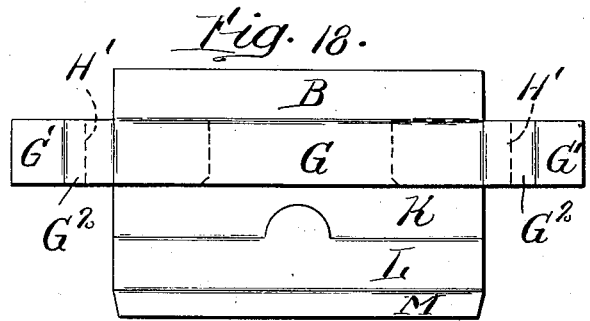
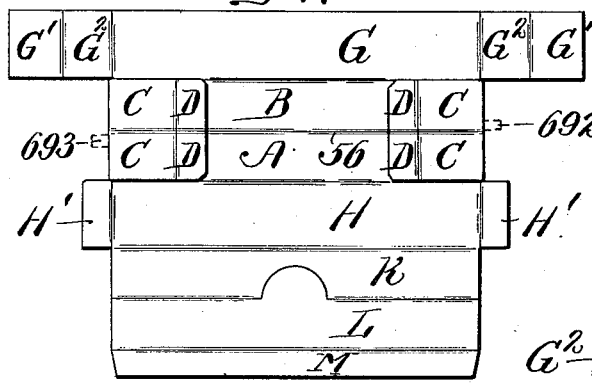
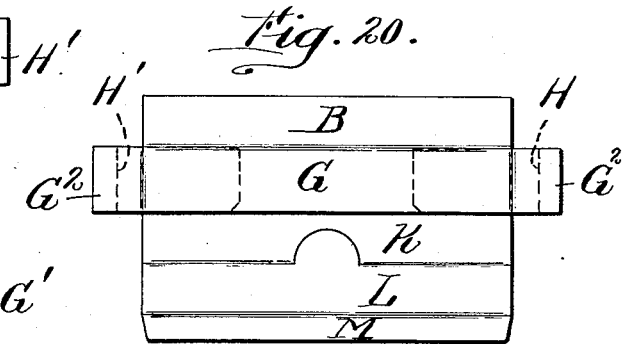
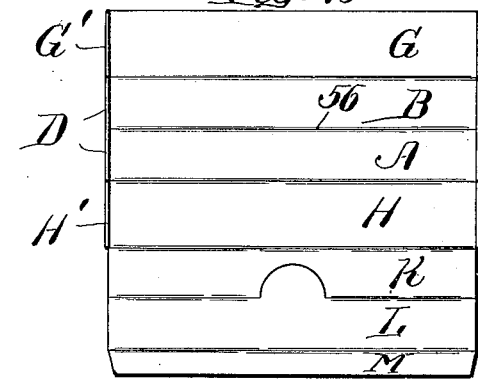
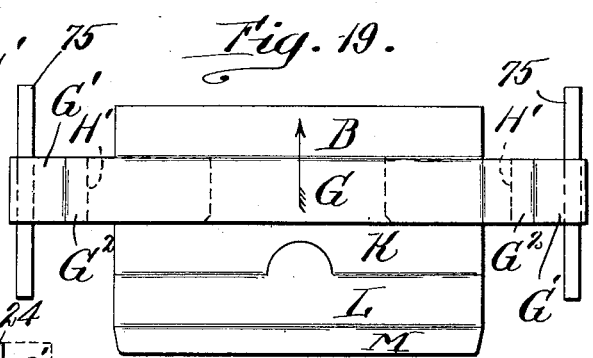
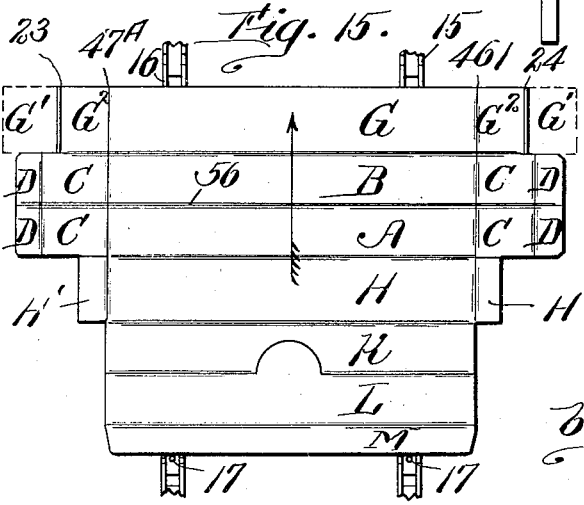
Inventor
Harold S. Labombarde
by George A. Rockwell
Atty.

Patented Aug. 28, 1934

1,972,021

UNITED STATES PATENT OFFICE 1,972,021

MACHINE FOR MAKING BOXES

Harold S. Labombarde, Nashua, N. H., assignor to The International Paper Box Machine Company, Nashua, N. H., a corporation of Maine Application April 3, 1930, Serial No. 441,280

20 Claims. (Cl. 93—49)

The principal feature of my invention is a machine for making what are known as collapsible boxes which machine accomplishes accurate folding on the desired lines of the blank.

Another feature is collapsing of the blank on a line crosswise of the blank by bending adjacent portions, the latter being intermediate of the ends of the blank and preferably this feature is combined with means for folding and gluing after such bending.

Another feature is mechanism for bending flaps of the blank while the latter is under perfect control.

Another feature is the use of folding bars longitudinally spaced to free one flap while retaining another flap in partially folded position.

Another feature is that the entire operations of collapsing, folding, gluing and feeding to a stacker are done in one direction.

Another feature is mechanism for collapsing the blank either upwardly or downwardly with relation to the path of the blank.

Other features will be pointed out below.

In the drawings

Figures 1, 2 and 3, taken together, form a side elevation of a machine embodying my invention;

Figures 4 and 5, taken together, are a plan view of that portion of the machine shown in elevation in Figures 2 and 3;

Figure 4ᵃ is a section on line 4ᵃ—4ᵃ of Figure 2;

Figure 4ᵇ is an elevation of the folding bars shown in Figure 4;

Figure 6 is a longitudinal section on line 6—6 of Figure 5;

Figure 7 is a section on line 7—7 of Figure 6;

Figure 8 is a detail section on a larger scale on line 8—8 of Figure 5 showing one form of collapsing mechanism;

Figure 9 is a similar detail section on an enlarged scale showing another form of collapsing mechanism;

Figure 10 is a section similar to Figure 9 but showing the parts in a different position;

Figure 11 is a side view of the parts shown in Figure 10 and shows also certain parts described below;

Figure 12 is a section on line 12—12 of Figure 11;

Figure 13 is a partial elevation of the parts shown at the right of Figure 11;

Figure 14 is a section on line 14—14 of Figure 13; and

Figures 15 to 20 show the successive steps in treating blanks.

Frame 1 has side portions which are re-enforced by suitable tie rods 2.

The blanks, whose form is shown in Figure 15, are placed in hopper 3 which is pivoted to the frame and adjustable by rod 4. The lowest blank is fed between rolls 5 and 6, the latter having rubber portions 7 extending into the roll 5. A suitable rotary brush 8 for the roll 5 may be provided. The parts so far described are substantially the same as the corresponding parts in my application Ser. No. 366,906.

Main driving shaft 9 drives bevel gear 10, the latter driving gear 11 indirectly, which, in turn, drives gear 12. Roll 6 and gear 11 are fixed to shaft 13 and roll 5 and gear 12 are fixed to shaft 14. Suitable sprockets are fixed to shaft 13 and drive chains 15 and 16 which carry feeding pins 17 fixed to the chains. These pins are appropriately spaced on the chains, and two of them, one on each chain, engage the rear of the blank and feed it between side guides 18 and 19 which accurately center the blank for the flap bending to be described.

It will be convenient at this point to refer to the blank shown in Figure 15 (and dotted in Figure 4) this blank being, before being placed in the hopper, creased or scored transversely and longitudinally as shown. In the finished box the portions A and B form the bottom of the box, the flaps C, D forming loose inner retaining end walls. The portion G will form one side wall and its doublt flaps G' G² will form end walls. The portion H will form the other side wall and its flaps H' will be glued to the corresponding flaps G'. The portions K, L and M will form the cover.

While the blank is accurately centered in its travel by the side guides 18 and 19 the flaps G' are bent upwardly, the idle rolls 20 and 21 fixed to shaft 22 engaging the top of the blank just inside of the longitudinal crease lines 23 and 24. The projections 25 on the driven rolls 26 and 27 engage the flaps G' and break them into vertical position. The shaft 28 to which the rolls 26 and 27 are fixed is driven by chain 29 and suitable gearing connected with the main shaft 9, which also drives, through suitable gearing, shaft 30 carrying sprockets engaging the forward ends of chains 15 and 16.

Shaft 30 has a gear 301 which, through idler gear 302, drives gear 303 and gear 304, gears 303 and 304 being fixed on shafts 305 and 306 which shafts carry rolls 308 and 309 between which the blank is fed from chains 15 and 16.

The blank is next fed between upper belt 31 and lower belt 32. Belt 31 is driven by a pulley on shaft 33 suitably operated by the main shaft 9. Belt 31 runs over several pulleys among which is tightening pulley 34 mounted on block 35 which may slide up or down on guides 36 when actuated by screw 37 rotated by handle 38. One of the upper belt pulleys 39 is mounted on arm 40 whose end may be adjustably moved in slot 41 to tighten the belt 31.

The lower belt 32 runs over the pulleys shown and pulley 42 may be mounted to be adjustably swung about pivot 43 to provide for tightening of the lower belt.

Suitable cages carrying rolls 44 are provided, the axes of these rolls being stationary and the rolls forming a support for the upper stretch of the lower belt.

Other cages carrying rolls 441 are provided, these rolls 441 engaging the top of the lower stretch of the upper belt, the weight of the rolls 441 tending to hold said stretch of the upper belt down on the blank, the cages carrying rolls 441 being mounted on a bracket 442 supported on cross shafts 443 and 444 on the frame and the rolls 441 being mounted to yield upwardly if necessary, the mounting of the cages on the bracket 442 being the same as the mounting disclosed in U. S. Letters Patent No. 1,444,347 to La Bombard et al. dated February 6, 1923.

As the blank is carried along by the belts 31 and 32 the folding bars 45 suitably mounted on angle irons 46 act to raise flaps $G^2$, double flaps C and flaps H' to a substantially vertical position bending them on lines 461 and 47A, the folding bars rising and also extending inwardly in the direction of the path of the blanks. When flap $G^2$ (G') passes bar 45 it drops outwardly in the space between folding bar 45 and folding bar 47 and returns to a substantially horizontal position, but double flap C can not so drop because said space will not permit, flap C being then folded further inwardly to horizontal position by folding bar 47 which extends further inwardly for this purpose. Flap H' will fall outwardly through said space to horizontal position, the blank then being in the form of Figure 17.

While the flaps are being bent upwardly the body of the blank is held firmly by the L-shaped members 46.

Bars 471 and 472, suitably attached to the angle irons 46, hold down the double flaps C D so that they will be substantially horizontal when the blank is collapsed as described below.

A supplemental cage 48 pivoted to arm 40, to which is also pivoted roll 39, carries rolls 50 which, by reason of said pivot, hold the blank down yieldingly while the blank travels from roll 39 to roll 51 on shaft 52.

The blank is fed across the gap between rolls 51 and 53 by belt 32 and against the stop 54, the forward end of the blank resting on platform 55.

The blank is now in position to be bent or collapsed on the line 56 (Figure 17).

The mechanism for doing this is shown most clearly in Figures 8 to 11.

Mounted on shafts 57 and 58 is a supporting frame 59 upon which slide rolls 60 to which is connected a carriage 61 having rods 62. Pivoted on rods 62 are links 63 having rolls 64 which ride in tracks 65 on the frame 59. The carriage 61 is moved up and down by cam 66 engaging roll 67 mounted on blocks 68 fast to rods 60. As cam 66 rotates it engages roll 67, raising and lowering the rods 60, carriage 61 and bars 62. Blades 69 are rigidly fastened (as by saw cut) to bars 62. As the carriage 61 is raised the rolls 64 move inward in the tracks 65 carrying the upper ends of the links inwardly and in so doing rotate the bars 62 and consequently blades 69, putting the latter into the position of Figure 10. Continued movement of the cam 66 will lower the carriage 61, whereupon the rolls 64 will move outwardly in track 65 and consequently the blades 69, which have been moving downward, will approach each other at their free ends, and engage portions of the blank adjacent to line 56. Further downward movement of blades 69 force the collapsed blank between rolls 51 and 53 as shown in Figure 8.

The blank is next fed between rolls 51 and 53, roll 51 carrying a series of belts 70 spaced by collars 71 fixed to roll 51, belts 70 running against a portion of roll 53 and around roll 72.

The feeding of the blank between roll 53 and belt 70 (the blank being in the form of Figure 18) presents the blank on top of lower belt 73 which in turn carries the blank a slight distance where it is engaged between upper belt 74 and lower belt 73, which carry the blank along with the lower (originally the upper) face of flap G' in position to be engaged by the glue roll 75 running in glue pot 76, the latter being mounted on shaft 77 and cross-bar 78 on main frame 1. The glue roll is rotated by suitable gearing from the main shaft 9. The glue roll is of relatively narrow periphery whose outer edge is spaced inwardly from the outer end of flap G' so that a comparatively narrow strip of glue is applied as shown in Figure 19.

The further movement of the blank between belts 73 and 74 bring it to folding bars 79 which extend downwardly and inwardly and are mounted on angle irons 80 which, in turn, are hung from shafts 81 and 82. These angle irons 80 are an upper support for flaps $G^2$ while the flaps are bent around by bars 79 to horizontal position where their then upper faces engage the lower faces of flaps H'. The blank is then fed in engagement with said bars 79 until it is in close adjacency to rolls 83 and 84 which grip and feed the blank and seal together by pressure the flaps H' and G', both of which, at this time, carry glue.

While the blank is passing between belts 73 and 74, the lower stretch of the belt is pressed down by rolls 85 mounted in cages 86 which may yield upwardly on guide bar 87. Stationary cage 88 carries rolls 89 which engage the lower face of the upper stretch of belt 73 to hold up said belt.

The rolls 83 and 84 present the blank to endless conveyor belts 90 and 91 which conduct the blank in the form shown in Figure 20 to any suitable table or stacking mechanism (not shown).

In Figures 9 to 14 I show a mechanism which acts to collapse the blank upwardly as shown clearly in Figure 9. In this mechanism the shaft 57 is driven by a sprocket suitably connected with the main shaft 9. Fast to shaft 57 are two cams 93 acting, through lever 94 pivoted at 95, to actuate the head 96 of slide 97 moving in ways 98 on the bracket 99 hung on shafts 57 and 58. The slide 97 has rigidly attached to it a bracket 100 forming a pivot for the lever 101, 102, the parts 101, 102 being rigidly connected at a right angle. Pin 103 projecting from lever 101, 102 rides along a track consisting of the face 104 of member 105 pivoted at 106 and also consisting of faces 107 and 108. When the pin 103 rides down face 108 it forces inwardly member 105 which yields to permit passage of the pin and which after such passage is returned to the position of Figure 13 by leaf spring 109 engaging stop 110. As the slide 97 is raised by cam 93 the levers 101, 102 are raised correspondingly, portions 102 breaking or collapsing the blank upwardly on line 56. On further upward movement of slide 97 pins 103 are moved outwardly along faces 107 by springs 111, this swinging movement resulting in portions 102 being swung downwardly and outwardly out of the path of the blank as shown in Figure 13. On the downward movement of the slide pin 103 rides down the face 108, forcing member 105 inward, and then assumes the horizontal position shown in Figure 11. After pin 103 leaves face 108 member 105 swings outwardly and its face 104 is in position to guide pin 103 upwardly.

The amount of vertical movement of slide 97 may be adjusted by adjusting the block carrying pivot 95 on ways 112 in bracket 99. Roll 113 engages the under side of head 96 and adjustment of said block to the left, for example, in Figure 12 will reduce the leverage of lever 94 and shorten the stroke of the slide.

Adjustment of the length of vertical travel of portion 102, for use with different blanks, is effected by screw 113 which moves portion 114 relative to the lower portion of member 99, corresponding adjustment of the movement of slide 97 being made by adjustment of the block carrying pivot 95 as explained above.

When the blank is collapsed upwardly by portions 102, portions A and B of the blank are engaged by blades 69, operated as previously described to pinch together said portions A and B, as shown in Figure 9, and the blank is then forced between roll 53 and belts 70 as previously described in the case where the blank is collapsed downwardly by blades 69.

Adjustment of brackets 99 transversely for different sizes of blanks is effected by applying a tool to the end of the screw-threaded shaft 115, which has right and left threads, and this adjustment may be used to move brackets 99 so far outwardly as to carry portions 102 out of operative position if it is not desired to provide the upward collapsing break.

The operation of my machine has been explained above but it will be additionally clear by examining Figures 15 to 20 that the blank shown in Figure 15 is fed until the flaps $G^2$ G', C D and H' are raised by bars 45 into the horizontal position of Figure 16, the flaps $G^2$ G' and H' then falling back through the longitudinal space between bars 45 and 46, the flaps C D being bent over into horizontal position by bar 46 as shown in Figure 17. The flaps C D are held down by members 471 and 472 and the blank is fed until it engages stop plate 54, rebound being checked by adjusting the feeding mechanism to the required distance from the stop plate. This adjustment is obtained by first loosening the tension of belt 31 by operating screw 37 through the crank 38 and then adjusting the end of arm 40 in slot 41, the pulley 39 and the cage 48 with the rolls 50 being in one unit with arm 40. This rebound is also checked by adjusting the bars 47 so that when the blank reaches stop plate 54 the flaps C D snap off and up from the bars 47 and automatically lock against rebound against the ends of bars 47, the blades 69 preventing said flaps from flying up beyond locking engagement with the ends of the folder bars. The blank is next collapsed by blades 69 (or by blades 69 and member 102), the collapsed blank, as shown in Figure 18, being fed downward by roll 53, belts 70 and being flexed around roll 53, breaking the crosswise scores. The blank is then fed into horizontal position between belts 73 and 74 which conduct the blank to the glue rolls, as shown in Figure 19, glue being applied to the then under side of flap portion G', this flap portion being then folded inwardly under flap 11 whereupon the flap portion G' and flap H' are pressed together as shown in Figure 20. The entire treatment of the blank, including the breaking of the scores is done in one longitudinal direction as distinguished from a machine having two sections at a right angle to each other, and this is a feature of great practical value.

It will be understood that if it is not desired to give the upward collapse by portions 102, the brackets 99 may be moved outwardly on shaft 57 so that said portions 102 will be in inoperative positions. The parts 102 and their actuating mechanism may be entirely removed from the machine if their use is not desired.

I provide members 691 which act as stops in Figure 8 and act to provide accurate breaking in the form of Figure 9 when the breaking first occurs and further act as stops during the upward collapsing.

In order to square up the blank longitudinally preparatory to collapsing the blank is fed against stop 54 and in order to square up the blank transversely preparatory to such collapsing I provide joggers or guides 692 and 693, one being mounted on one blade and the other on the other, these guides being spaced transversely of the machine sufficiently to engage the side edges of the blank as shown in Figure 17.

What I claim is:

1. A machine of the character described comprising means for feeding a blank; means for bending adjacent portions of a blank out of the path of said feed on a line crosswise of the blank and into parallelism with each other, said portions being intermediate of the end portions of the blank and said blank having two sets of flaps, said bending means including two members extending crosswise of the blank, one member engaging one of said portions and the other member engaging the other of said portions; means to feed the blank with said portions so bent to gluing mechanism; means to apply glue to one of said sets of flaps; and means to press the flaps having glue applied and the corresponding flaps of the other set together.

2. A machine of the character described comprising means for feeding a blank; means for bending adjacent portions of a blank out of the path of said feed on a line crosswise of the blank and into parallelism with each other, said portions being intermediate of the end portions of the blank and said blank having two sets of flaps, said bending means including two members extending crosswise of the blank and mounted to oscillate about axes which extend crosswise of the blank, one member engaging one of said portions and the other member engaging the other of said portions; means to feed the blank with said portions so bent to gluing mechanism; means to apply glue to one of said sets of flaps; and means to press the flaps having glue applied and the corresponding flaps of the other set together.

3. A machine for making a box from a blank comprising means to collapse in one direction that portion of the blank which is to form the bottom of the box; and means to feed the collapsed blank in the opposite direction.

4. A machine for making a box from a blank comprising means to feed a blank; means for partially collapsing in one direction out of the feeding path those portions which are to form the bottom of the blank; means moving in the opposite direction to complete the collapse; and means to feed the completely collapsed box in said opposite direction.

5. A machine for making a box from a blank comprising means to feed a blank; means to collapse that portion of the blank which is to form the bottom of the box in a vertical direction out of the feeding path; and means to feed the collapsed blank in the opposite vertical direction.

6. A machine of the character described comprising means for feeding a blank; means for bending adjacent portions of a blank out of the path of said feed on a line crosswise of the blank and into parallelism with each other, said portions being intermediate of the end portions of the blank and said blank having two sets of flaps, said bending means including means to engage and partially collapse the blank on said line at one face of the blank and including two other members extending crosswise of the blank and engaging the opposite face of the blank, one of said other members engaging one of said portions and the other of said other members engaging the other of said portions to complete said collapse; means to feed the blank with said portions so bent to gluing mechanism; means to apply glue to one of said sets of flaps; and means to press the flaps having glue applied and the corresponding flaps of the other set together.

7. A machine of the character described comprising means for feeding a blank; means for bending adjacent portions of a blank out of the path of said feed on a line crosswise of the blank and into parallelism with each other, said portions being intermediate of the end portions of the blank and said blank having two sets of flaps, said bending means including means to engage and partially collapse the blank on said line at one face of the blank and including two other members extending crosswise of the blank and engaging the opposite face of the blank, one of said other members engaging one of said portions and the other of said other members engaging the other of said portions to complete said collapse; means to move the first-mentioned engaging means out of the path of the blank; means to feed the blank with said portions so bent to gluing mechanism; means to apply glue to one of said sets of flaps; and means to press the flaps having glue applied and the corresponding flaps of the other set together.

8. A machine for making a box from a blank comprising means to feed a blank; and means to collapse upwardly that portion of the blank which is to form the bottom of the box, said collapsing means comprising a lever having two portions fixed together at substantially a right angle, one portion being pivoted and the other portion engaging the lower face of the blank, said lever having a projection; a track for said projection comprising a pivoted vertical portion, a horizontal portion and a portion extending downwardly and inwardly; means to draw said lever outwardly along said vertical portion to the top of said downwardly and inwardly extending portion; and means to move said projection upwardly along said vertical portion and downwardly along said downwardly and inwardly extending portion.

9. A machine for making a box from a blank comprising means to feed a blank; and means to collapse upwardly that portion of the blank which is to form the bottom of the box, said collapsing means comprising a lever having two portions fixed together at substantially a right angle, one portion being pivoted and the other portion engaging the lower face of the blank, said lever having a projection; a track for said projection comprising a pivoted vertical portion, a horizontal portion and a portion extending downwardly and inwardly; means to draw said lever outwardly along said vertical portion to the top of said downwardly and inwardly extending portion; and means to move said projection upwardly along said vertical portion and downwardly along said downwardly and inwardly extending portion; and means to adjust said track.

10. A machine for making a box from a blank comprising means to feed a blank; means for partially collapsing in one direction out of the feeding path those portions which are to form the bottom of the blank; means moving in the opposite direction to complete the collapse; and means to feed the completely collapsed box in said opposite direction, said means for partially collapsing being mounted to be moved into inoperative position if desired.

11. A machine for making a box from a blank having double flaps to the outer portion of which glue is to be applied, said blank having also other flaps, said machine comprising means for breaking the outer portions of the double flaps with relation to the inner portions; means for feeding the blank from said breaking means; and means for breaking all of said flaps with relation to the body of the blank; and means for folding said other flaps into substantial parallelism with the body of the blank.

12. A machine for making a box from a blank having a double flap comprising supporting means engaging the inner portion of the flap at one face thereof; means engaging the outer portion of said flap at the other face of the blank to break the outer portion of the flap, said breaking means being located to cooperate with said supporting means; and means including side walls for accurately positioning the blank during said breaking.

13. In a machine for making boxes from a blank which has three flaps at each side the combination of means to feed the blank; and means to break all three flaps at each side of the blank, two of said flaps at each side of the blank being free to resume substantially horizontal positions after such breaking; and means to fold the other flap at each side over against the body of the blank leaving said two flaps at each side substantially horizontal.

14. In a machine for making boxes from a blank which has three flaps at each side the combination of means to feed the blank; and a set of folding bars at each side of the blank, the bars of each set being spaced relatively to each other longitudinally of the machine, the rear bar of each set acting to break all three flaps at each side of the blank, two of said flaps at each side of the blank being free to move through the longitudinal spaces between said bars back to substantially horizontal position after said breaking and the forward bars of each set acting to fold the other flap at each side over against the body of the blank.

15. A machine for making a box from a blank having double flaps to the outer portion of which glue is to be applied, said blank having also other flaps, said machine comprising means for breaking the outer portions of the double flaps with relation to the inner portions; means for feeding the blank from said breaking means; and means for breaking all of said flaps with relation to the body of the blank; and means for accurately positioning the blank transversely of the machine during said breaking of said outer portions; and means for folding said other flaps into substantial parallelism with the body of the blank.

16. In a machine for making boxes the combination of means for feeding a blank in a desired path; means for squaring up the blank longitudinally preparatory to collapsing; means for squaring up the blank transversely preparatory to collapsing; means for collapsing out of said path those portions of the blank which are to form the bottom of the box; means for feeding the blank in such collapsed form; and means for securing portions of the blank when fed in such collapsed form.

17. In a machine for making boxes the combination of means for feeding a blank in a desired path up to a stop preparatory to collapsing; guides to register the blank transversely in its stopped position; means to prevent rebound from said stop; means for collapsing out of said path those portions of the blank which are to form the bottom of the box; and means for feeding the blank in such collapsed form; and said stop.

18. In a machine for making boxes means for folding over selected marginal portions on to the body of a blank; guides to register the blank into accurate transverse position, said guides acting against the folded marginal portions; and means for collapsing the blank.

19. In a machine for making boxes means for folding over selected marginal portions on to the body of a blank; guides to register the blank into accurate transverse position, said guides acting against the folded marginal portions; means to register the blank accurately longitudinally; and means for collapsing the blank.

20. In a machine for making collapsible bottom boxes, means for feeding a blank through the machine, means for folding portions of the blank which are to form the bottom of the box, means for feeding the blank in such folded form, and means for securing other portions of the blank together while such blank is in such collapsed form and means for delivering said collapsed blank from the machine.

HAROLD S. LABOMBARDE.